United States Patent [19]

Scheidler

[11] 4,315,483

[45] Feb. 16, 1982

[54] ANIMAL FEEDER

[75] Inventor: Raymond T. Scheidler, Saginaw, Mich.

[73] Assignee: Ronald Frederick Park, Saginaw, Mich. ; a part interest

[21] Appl. No.: 138,204

[22] Filed: Apr. 7, 1980

[51] Int. Cl.³ .............................................. A01K 7/00
[52] U.S. Cl. ................................ 119/51.11; 119/51.5; 119/74
[58] Field of Search .................... 119/51.11, 51.5, 54, 119/74

[56] References Cited

U.S. PATENT DOCUMENTS

| | | | |
|---|---|---|---|
| 2,701,548 | 2/1955 | Wolfe | 119/51.5 |
| 3,256,861 | 6/1966 | Giltner | 119/51.11 |
| 3,527,191 | 9/1970 | Kawecki | 119/51.5 |
| 3,742,913 | 7/1973 | Crippen | 119/51.11 |

FOREIGN PATENT DOCUMENTS 1469030  3/1977  United Kingdom ............... 119/51.5

Primary Examiner—Jay N. Eskovitz
Attorney, Agent, or Firm—John J. Swartz

[57] ABSTRACT

An animal feeder comprising a storage container for storing consumable products such as animal food; a food dispenser for dispensing the product from the container; a feed tray for receiving the dispensed product; and a control system which is periodically operated when less than a predetermined amount of product is received by the trough to drive the dispenser which dispenses product to the tray until the predetermined amount of product is again received by the tray.

14 Claims, 9 Drawing Figures

ANIMAL FEEDER

FIELD OF THE INVENTION

This invention relates to an animal feeder and more particularly to apparatus for dispensing food to a feed trough at predetermined intervals to replenish any food which an animal has removed from the feed trough.

BACKGROUND OF THE INVENTION

Animal owners who have suitable pens, corrals and cages and the like for restraining unattended pets for extended periods of time frequently employ someone to feed their pets. Animals are conventionally fed at selected intervals, such as morning and evening. The expense of employing someone to twice daily feed an animal can be substantial.

Pet owners who have enclosed areas, such as fenced yards, sometimes permit their pets to remain unattended in the fenced area for limited periods. Feeding is sometimes attempted by merely depositing, in an open container, a supply of food which should adequately feed the animal during the period of absence. Such practice invites other animals to enter the fenced area and consume the food. Moreover, the food is sometimes subjected to the elements and becomes contaminated. This practice also encourages the bad habit of over-eating. Since either an over supply or under supply of food encourages improper feeding habits, the practice should be avoided. Accordingly, it is an object of the present invention to provide new and novel apparatus for periodically dispensing animal food.

It is another object of the present invention to provide a new and novel animal feeder which will improve the dietary health by regulating the allowance of food for animals.

Animal feeders have been provided heretofore, such as that disclosed in U.S. Pat. No. 3,741,162 granted to Antonio R. Lopes on June 26, 1973 and U.S. Pat. No. 3,527,191 issued to Ralph E. Kawecki on Sept. 8, 1970, however, such prior art animal feeders dispense a fixed quantity of food at periodic intervals. If an animal does not consume the dispensed food at one of the feedings, the prior art animal feeder would dispense an over supply of food at the next feeding. This does not encourage good eating habits.

An automatic poultry feed and water dispenser is disclosed in U.S. Pat. No. 2,701,548 issued to W. E. Wolfe on Feb. 8, 1955 and operates to dispense food when the previously dispensed food has been consumed. Such a feeder might allow the animal to consume an excessive amount of food.

It is another object of the present invention to provide apparatus which will operate at predetermined intervals, when less than a predetermined amount of product, such as food, is received by a trough, to dispense feed until the predetermined amount of product is again received by the trough.

Other objects and advantages of the present invention will become apparent to those of ordinary skill in the art as the description thereof proceeds.

SUMMARY OF THE INVENTION

An animal feeder comprising a storage hopper for storing consumable products such as animal food; a selectively enabled and disabled dispenser for dispensing product from the storage hopper; a feed trough for receiving a predetermined amount of dispensed product to be consumed by an animal; and a control system, operable at predetermined intervals, when less than the predetermined amount of product is received by the trough, for enabling the dispenser to dispense product until the predetermined amount of consumable product is again received by the feed trough; the control system including mechanism for disabling the dispenser when the predetermined amount of product is again received by the trough.

The present invention may more readily be understood by reference to the accompanying drawings, in which:

DESCRIPTION OF THE PREFERRED EMBODIMENT

Apparatus constructed according to the present invention, generally designated 10, includes a generally rectangular base 12 mounting integral, vertically extending, hollow, cylindrical hoppers 14 and 16. The cylindrical hoppers 14 and 16 serve to receive and store a supply of food F and water W respectively. The base 12 includes a rectangular bottom wall 12E mounting upwardly converging front and rear walls 12A and 12B respectively, upwardly converging sidewalls 12C and an intermediate wall 12D interjacent the sidewalls 12C.

Sidewall portions 12F and rear wall portions 12G integrally join the sidewalls 12C and rear wall 12B of base 12 to the hollow storage cylinders 14 and 16. The intermediate wall 12D includes a upwardly projecting central web portion 12H which is common to the cylinders 14 and 16.

Figure 3:
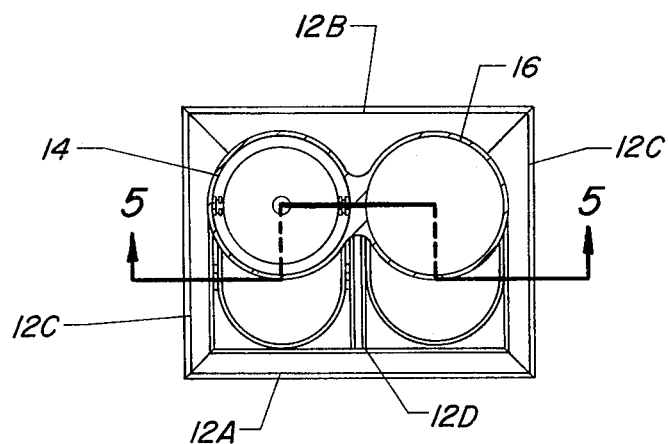
FIG. 3 is a sectional plan view thereof, taken along the line 3—3 of FIG. 2.
Figures 1, 2:
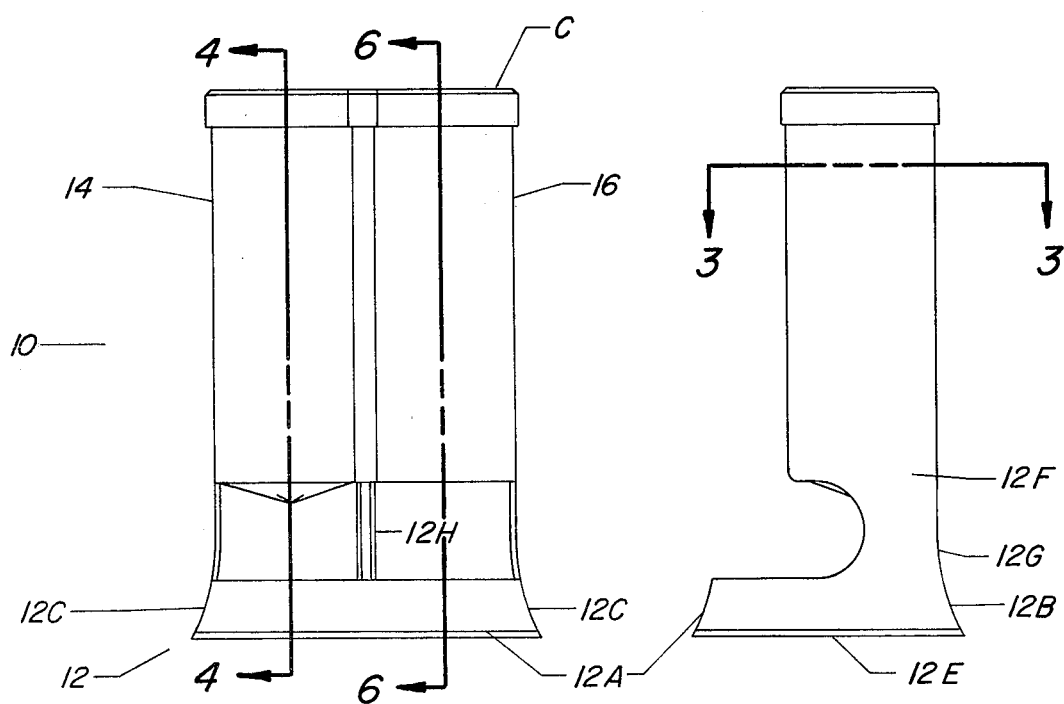
FIG. 1 is a front end elevational view of product dispensing apparatus constructed according to the present invention.
FIG. 2 is a side elevational view thereof.
Figure 4:
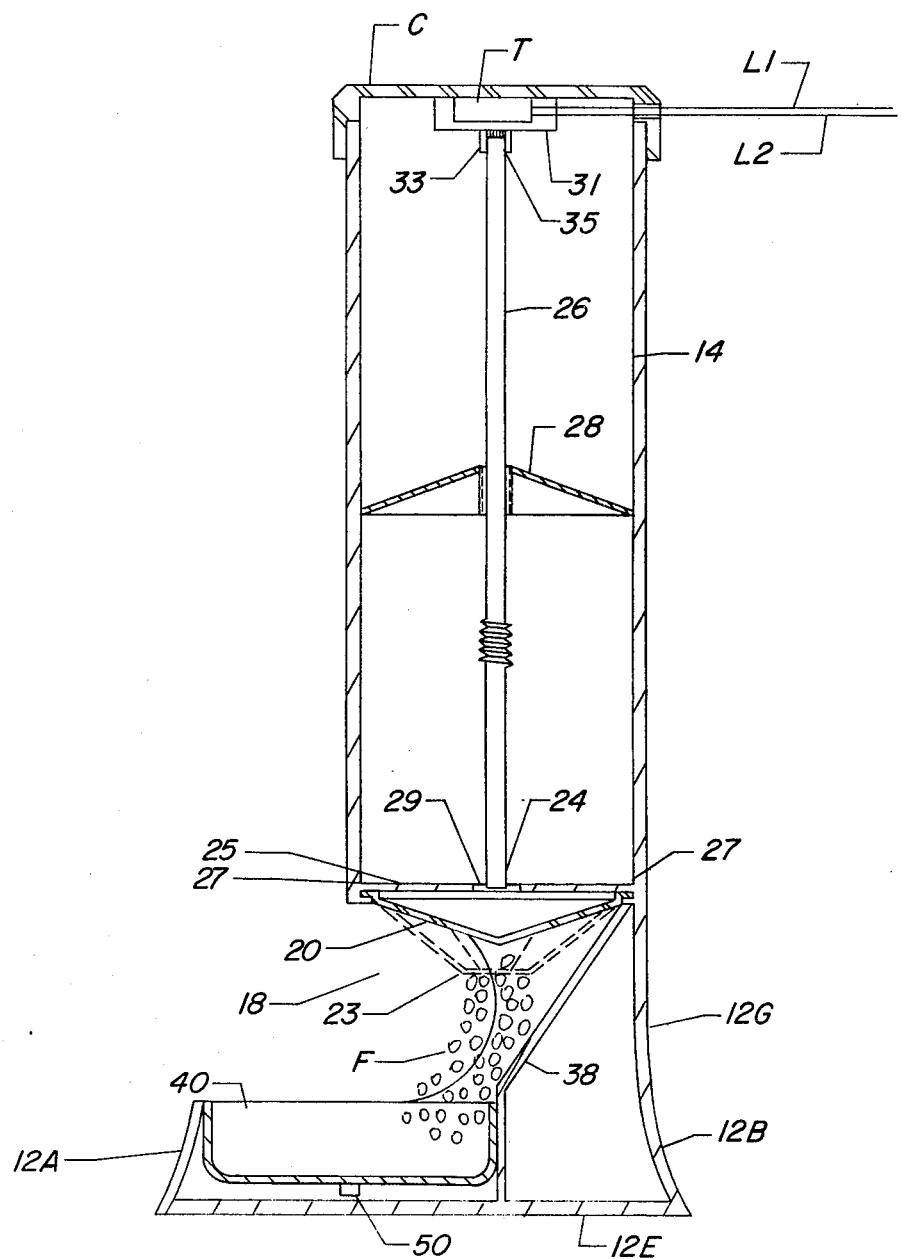
FIG. 4 is an enlarged sectional side elevational view, taken along the line 4—4 of FIG. 1.

The lower end of the food receiving hopper 14 is closed by an expansible and contractible gate, generally designated 18. The gate 18 includes a plurality of circumferentially spaced, partially overlapping yieldable members 20 having their radially outer ends mounted in a circumferential slot provided at the lower end of the food hopper 14. The yieldable members 20 normally close the lower end of cylinder 14 but when forced downwardly to the positions illustrated in chain lines in FIG. 4, will separate and provide a variable diameter aperture or orifice 23 between the radially inner, terminal ends thereof, allowing the downward passage of food schematically designated F. When food is not forced downwardly against the expansible and contractible gate 18, the yieldable members 20, which may suitably comprise resilient materials such as rubber, will retract or tend to retract to the partially overlapping positions illustrated in solid lines in FIG. 4 to close the aperture 23.

A vertically extending screw shaft 26, disposed in the food cylinder 14, includes a lower end 24 journaled in a bearing 29 provided on a support bar 25 spanning the opposing, lower end sidewall portions 27 of the feed cylinder 14.

Figure 8:
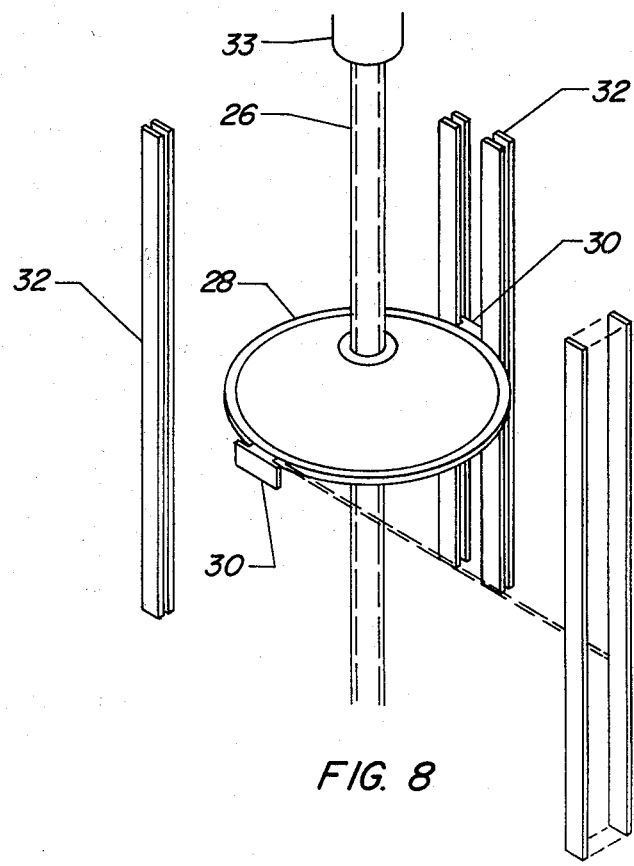
FIG. 8 is an enlarged, exploded view illustrating mechanism for dispensing food from the food hopper.

A curvilinear food presser plate 28 is threadily received on the screw shaft 26 and includes a pair of slides 30 (FIG. 8) received by guides 32 provided on opposite sides of the cylinder 14. As the screw shaft 26 is rotated in one direction, in a manner to be described, the food presser plate 28 is vertically moved downwardly to force the food F downwardly. As the food F moves downwardly, the yieldable members 20 are forced downwardly to the position illustrated in chain lines in FIG. 4 to define the aperture 23 which passes the downwardly moving food F.

A cover, generally designated C, is provided for closing the upper ends of the cylinders 14 and 16. The cover can be removed to permit filling of the cylinders 14 and 16 with food F and water W respectively. An electrically driven motor 31 is mounted on the inside of the cover C and includes an internally splined drive coupling 33 which is slideably removably received by a complimentally splined upper end portion 35 of screw shaft 26. The motor 31 is coupled to a suitable source of power, such as 110 volt alternating current via electrical leads L1 and L2. When the cover C is removed, the splined coupling 33 is removed from the upper end 35 of shaft 26 to decouple the motor 31 from the shaft 26.

A timer T is also mounted on the inside of cover C for a purpose to be described more particularly hereinafter.

Mounted inwardly of the rear wall portion 12G, at a level below the food cylinder 14, is a food guide plate 38 for forwardly directing food F which has downwardly passed through the opening 23.

Figure 5:
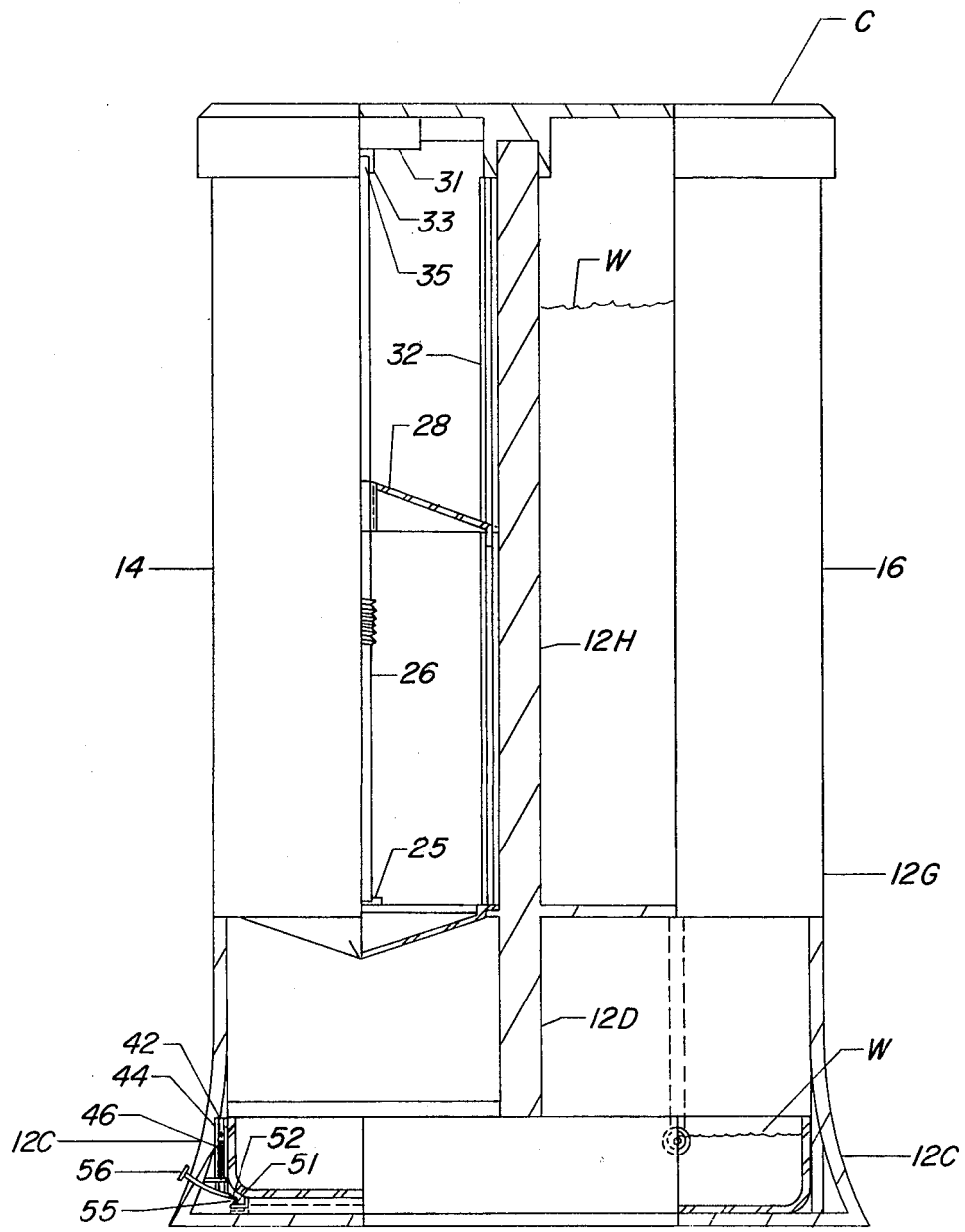
FIG. 5 is an enlarged front sectional view, taken along the line 5—5 of FIG. 3.

A feed trough or tray, generally designated 40, partially underlies and is partially spaced forwardly of the food hopper 14. The food receiving tray 40 is received by the base walls 12A, 12B, 12C and 12D for vertical movement between the raised position illustrated in solid lines in FIGS. 4 and 5 and the lowered position illustrated in chain lines in FIG. 5. A pair of slides 42 are mounted on laterally opposite sides of the tray 40 and are slidingly received by guides 44 which guide the tray for vertical movement. The slides 42 are yieldably supported by coil springs 46 which in turn are supported by stub frame members 48 projecting inwardly from one of the side walls 12C and the interior wall 12D. The springs 46 urge the tray 40 upwardly to the raised position illustrated in FIG. 5 when the tray 40 is empty. A switch contact 50 is mounted on an L-shaped support 51 depending from the underside of the feed tray 40. An electrically conductive switch contact 52 envelopes the terminal end of an electrically nonconductive, yieldable member 53 which is integral with an eccentrically mounted screw 54 that is threadedly received in the adjacent base sidewall 12C. The yieldable member 53 normally urges the contacts 52 and 50 into engagement 55. When the tray 40 is filled with a predetermined amount of food F, the feed tray 40 will be moved downwardly, against the upwardly directed biasing force of springs 46, to the lowered position illustrated in chain lines in FIG. 5 to open the contacts 50 and 52. As the tray 40 moves downwardly a predetermined distance, however, the contacts 50 and 52 will separate to open a circuit as will be described more particularly hereinafter.

The mounting screw 54 is eccentrically, threadedly mounted in the adjacent sidewall 12C so that the distance which the feed tray 40 must move before the contacts 50 and 52 become disengaged can be adjusted. With the turning of a hand operated dial 56, mounted on screw 54, the contacts 50 and 52 can thus be adjusted for "light", "medium", and "heavy" loads, as will become apparent more particularly hereinafter. The screw 54, when rotated about its axes, will move the contact 52 upwardly and downwardly to adjust the "normally open" spacing between the switch contacts 50 and 52. The contacts 50 and 52 are coupled in circuit relation with a motor winding M1 (FIG. 9) of motor 31 as will be described more particularly hereinafter.

Turning now more particularly to the water storage hopper or cylinder 16, the lower end thereof is closed via a bottom wall 56 having an aperture 58 therein receiving a conduit or tube 60. A water receiving water trough or tray, generally designated 62, is mounted on the base 12 so that a portion thereof partially underlies the cylinder 16 and the front portion thereof is spaced slightly forwardly of the cylinder 16. As opposed to the food or water tray 40, which is vertically movable, the tray 62 is stationarily mounted. A vertical support wall 64 spans the bottom cylinder wall 56 and the bottom wall 12E of base 12. The lower terminal end or outlet 66 of the tube 60 passes through an opening 68 in the vertical support wall 64 and an aperture 70 provided in the rear wall 72 of water receiving tray 62. When the water W in the tray 60 reaches a level covering the opening 66 at the lower end of tube 60, the flow of water from the tank 16 to the tray 62 will be interrupted due to equalization of atmospheric pressure at opposite ends of tube 60. The cover C substantially seals the upper end of tank 16 so that the water will stop when the level of the water W in tray 62 covers the outlet or lower terminal end 66 of tube 60.

Figure 9:
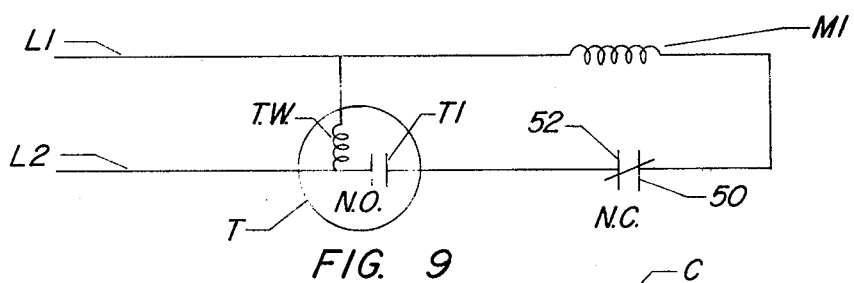
FIG. 9 is a schematic diagram of an electrical control circuit for operating the apparatus constructed according to the present invention.

Referring now more particularly to FIG. 9, the input circuit lines L1, L2 are coupled to a suitable source of power such as 110 volt alternating current. Connected in series circuit with the line L1 is the motor winding M1 for driving motor M.

Figure 6:
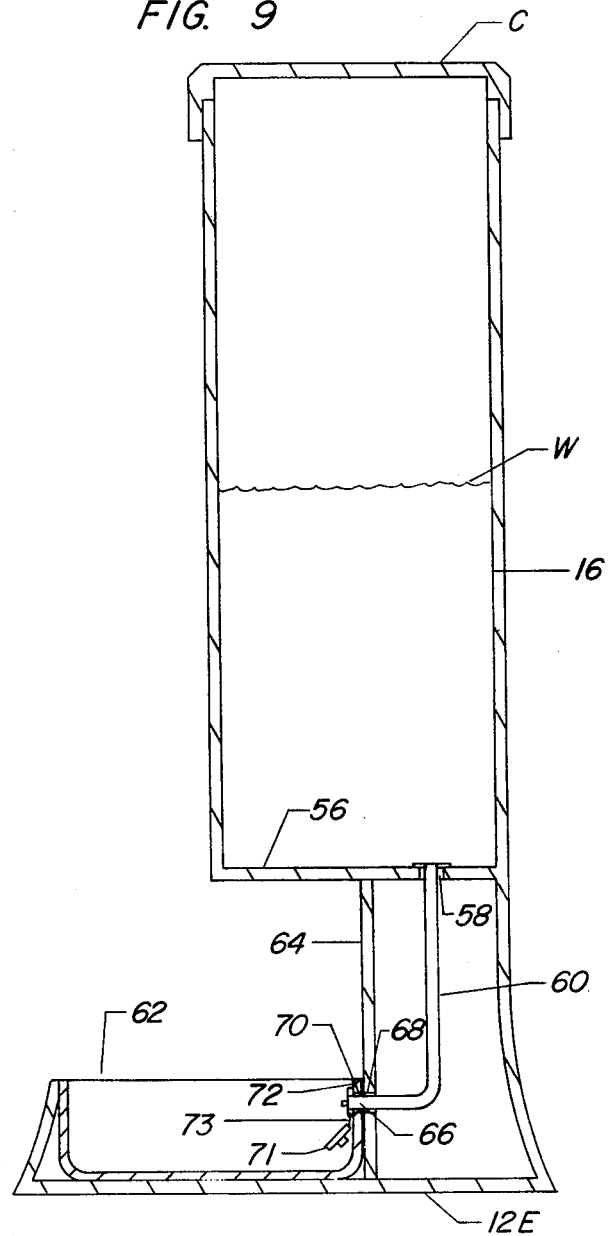
FIG. 6 is an enlarged sectional side view, taken along the line 6—6 of FIG. 1, more particularly illustrating the water dispensing portion of the apparatus.
Figure 7:
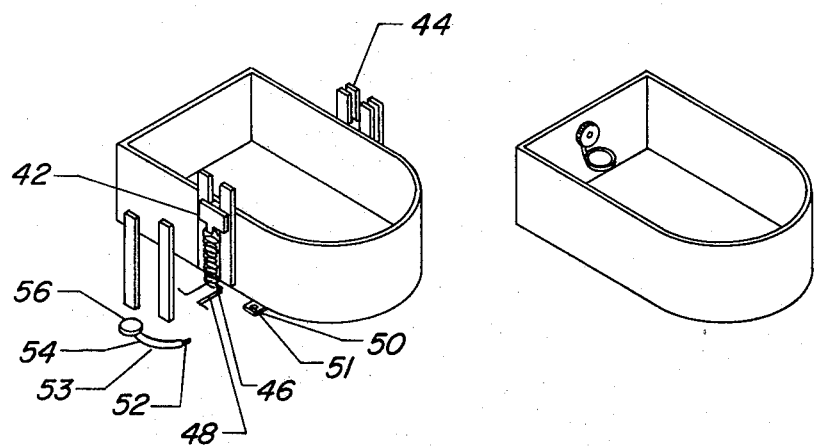
FIG. 7 is an enlarged prospective view illustrating only the food and water receiving troughs.

A closure cap 71 is mounted on the rear water tray wall 72 via an integral, flexible coupling member 73 for movement between the removed position illustrated in FIG. 6 and a position covering the outlet 66 to preclude the flow of water through tube 60 when the device is not in use.

The contacts 50 and 52 are illustrated in FIG. 9 as being normally closed and connected in series circuit with the motor winding M1. The timer T is illustrated as including a drive winding TW coupled across the lines L1 and L2. The timer T also includes a set of normally open contacts T1 connected in series with the winding M1 and the normally closed contacts 50 and 52.

THE OPERATION

The water closure cap 71 will, during transportation of the unit 10, be positioned to close the water outlet opening 66. The cover C is removed so that the cylinder 16 can be filled with water W. Before the food is placed in the food storage hopper 14, the screw 26 and pusher plate 28 are moved upwardly to remove the lower screw end 24 from the support bar 25. The cylinder 14 is filled with food F to the desired level. The screw 26 is then replaced to the position illustrated in FIG. 4 in which the lower end 24 is again journaled in the bearing 29 of support bar 25. If desired, rather than removing the screw shaft 26, the screw shaft can remain in the position illustrated and merely rotate in a direction to remove the food presser plate 28 upwardly to a position at the upper end of the screw shaft 26. The plate 28 is then removed from the screw shaft 26. Food is then placed in the food storage cylinder 14 and the food presser member 28 is then again replaced on the upper end of the screw 26 with the slides 30 received in the guides 32. The cover C is then replaced on the hoppers 14 and 16 so that the complementally splined coupling 33 of motor M and the splined shaft end 35 are in driving engagement. The food receiving tray 40, at this time, will be in the raised position and the contacts 50, 52 will be closed.

After the timer winding TW is operated for the predetermined interval, the timer contacts will close and power will be applied to the motor winding M1. As the motor M is driven, the shaft 26 will turn to drive the food presser plate downwardly and force food F against the yieldable members 20 which will spread and permit food to be dispensed through the opening 23 to be received by the feed tray 40. When a predetermined quantity of food F is received by the feed tray 40, the contacts 50, 52 will open and the motor winding M1 will be de-energized.

The closure cap 71 is removed from the outlet 66 and water W will fill the tray 62 until the opening 66 is covered at which time atmospheric pressure will interrupt the further passage of water W into the tray 62.

As the animal consumes water W, the level of the water W in tray 62 will drop to a level below the opening 66. When this occurs, the water will again flow downwardly through the tube 60 until the water W again reaches a level covering the outlet 66.

If the animal does not consume food, the contacts 50 and 52 will remain open. When the timer again "times out" to close the normally open contacts T1 at the next scheduled feeding. The motor winding M1 will not be energized because the normally closed contacts 50, 52 will remain open. If, however, an animal consumes all or a portion of the food F in the feed tray 40, the tray support springs 46 will move the tray 40 upwardly to again close the contacts 50, 52. As the timer "times out" and the timer contacts T1 again close, the winding M1 will then be energized to drive the motor 31 which will in turn drive the shaft 26 and force the plate 28 downwardly to force food F into the tray 40. As additional food enters the tray 40, the tray 40 will move downwardly to again open the contacts 50, 52 and de-energize winding M1 50.

The dial 53 can be adjusted to adjust the position of contact 52 relative to contact 50 so that the motor 31 will be operated for longer or shorter periods of time as desired, to provide greater or lesser quantities of food F to the tray 40 as desired.

It is to be understood that the drawings and descriptive matters are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An animal feeder comprising:
    storage means for storing consumable product such as animal food;
    selectively enableable and disableable food dispensing means for dispensing said consumable product from said storage means;
    feed trough means for receiving a predetermined amount of dispensed product to be removed by an animal for consumption; and
    control means, operable at predetermined intervals when any portion of said predetermined amount of consumable product has been removed from said trough means, for enabling said dispensing means to dispense product until said predetermined amount of consumable product is again received by said feed trough means;
    said control means including means for disabling said dispensing means when said predetermined amount of consumable product is again received by said trough means.

2. The animal feeder set forth in claim 1 wherein said storage means comprises a feed receiving container having an outlet therein; said food dispensing means being received by said container for driving feed in said container through said outlet; said control means including timer means for periodically coupling said dispensing means at said predetermined intervals, to a source of power to operate said dispensing means.

3. The animal feeder set forth in claim 2 wherein said feed trough means comprises a food receiving tray mounted for movement between a first position and a second position; means yieldably urging said food receiving tray to said first position but permitting movement toward said second position when said product is received by said tray.

4. The animal feeder set forth in claim 3 wherein said control means includes means responsive to said feed tray being in said second position for disabling said dispensing means.

5. The animal feeder set forth in claim 4 wherein said dispensing means includes a rotatable member and drive means for selectively rotating said rotatable member; said control means including timer means connected in circuit with said drive means for periodically coupling said drive means to a source of power; said control means including means responsive to said tray being in said second position for decoupling said drive means and said source of power.

6. The animal feeder set forth in claim 5 wherein said dispensing means includes a product pusher member, threadedly received by said rotatable member for vertical movement in said storage means as said rotatable member is rotated downwardly to force product in said storage means to said food receiving tray.

7. The animal feeder set forth in claim 5 wherein said storage means includes an upwardly opening food receptacle; said feeder further including cover means removably mounted on said receptacle to selectively cover and uncover said upwardly opening food receptacle, said drive means comprising motor means mounted on said cover means for movement therewith between a position coupled to said rotatable member when said cover means covers said receptacle and a position uncoupled from said rotatable member when said storage means is uncovered.

8. The animal feeder set forth in claim 1 wherein said storage means comprises a generally hollow, openended, cylindrical upstanding food receiving hopper, a removable cover for selectively closing the upper end of said hopper; said food dispensing means comprising a vertical screw shaft rotatably mounted in said hopper, vertical guide means on the inside of said hopper, and a food pusher plate in threaded engagement with said screw shaft, mounted for vertical guiding movement by said guide means for driving food downwardly as said screw shaft is rotated; expansible and contractible closure means closing the lower end of said hopper and being expansible, when food is moved downwardly, to provide an enlarged outlet opening for the downward passage of food and being contractible when food is not being forced downwardly to reduce the outlet opening.

9. The animal feeder set forth in claim 8 wherein said feed trough means comprises a food receiving tray mounted for vertical movement; spring means yieldably urging said tray to said first position but permitting movement of said tray to said second position; said control means including a drive motor mounted on said cover, a timer having contacts which periodically close to couple said motor to a source of power, and switch means responsive to said food tray being in said second position for decoupling said drive motor and said source of power and permitting said contacts to couple said motor to said source of power when said tray is located between said first and second positions, said motor being mounted on said cover for movement therewith between a position drivingly coupled to said screw shaft when said cover closes the upper end of said hopper, and a position uncoupled from said screw shaft when said cover does not close said upper end of said hopper.

10. The animal feeder set forth in claim 1 wherein said storage means comprises a first hollow upstanding cylindrical hopper for receiving solid food and a second hollow upstanding cylindrical hopper for receiving liquid, such as water; said feed trough means comprising a first food tray mounted for vertical movement between said first and second position in response to the quantity of food therein and a second liquid receiving tray for receiving water from said second cylinder; said dispensing means including a first movable dispenser, disposed in said first hopper, for forcing food downwardly in said first hopper and a second dispenser comprising a conduit having one end communicating with said second hopper and a second end disposed in spaced relation above said second tray.

11. The animal feeder set forth in claim 1 wherein said storage means includes an upstanding, hollow, cylindrical hopper and a cover removably mounted on the upper end of said hopper to close said hopper; said dispensing means includes a rotatable member received by said hopper and motor means mounted on said cover and removably coupled to said rotatable member when said cover closes the upper end of said hopper.

12. The apparatus set forth in claim 9 wherein said switch means includes a switch contact mounted on said tray for movement therewith and an opposing contact; and means adjustably mounting said opposing switch contact for movement between any one of a plurality of different positions toward or away from said first switch contact.

13. The feeder set forth in claim 1, wherein means mounts said trough means for vertical movement between a first position when said trough means is empty and a second position wherein said trough means receives said predetermined amount of product; said control means including timer means for cyclically coupling said dispensing means to a source of power, and means, normally coupling said timer means to said source of power when said trough means is located between said first and second positions, operable to decouple said timer means from said source of power when said trough means is in said second position.

14. An animal feeder comprising:
storage means for storing consumable product such as animal food;
selectively enableable and disableable food dispensing means for dispensing variable quantities of said consumable product from said storage means;
feed trough means for receiving a predetermined amount of dispensed product to be removed by an animal for consumption; and
control means, operable at predetermined intervals when less than said predetermined amount of consumable product is received by said trough means, for enabling said dispensing means to dispense variable quantities of product to replenish said feed trough means with a quantity of product equal to the quantity of product removed;
said control means including means for disabling said dispensing means when said predetermined amount of consumable product is again received by said trough means.

* * * * *